United States Patent
Jin et al.

(10) Patent No.: US 8,176,140 B2
(45) Date of Patent: May 8, 2012

(54) HOME NETWORK DEVICE CONTROL SERVICE AND/OR INTERNET SERVICE METHOD AND APPARATUS THEREOF FOR CONTROLLING INTERNET SERVICES AND HOME NETWORK DEVICES BASED ON A SCRIPT

(75) Inventors: Ho Jin, Yongin-si (KR); Young-chul Sohn, Seoul (KR); Jong-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 735 days.

(21) Appl. No.: 11/967,317

(22) Filed: Dec. 31, 2007

(65) Prior Publication Data

US 2008/0270562 A1 Oct. 30, 2008

(30) Foreign Application Priority Data

Apr. 30, 2007 (KR) .................. 10-2007-0042112

(51) Int. Cl.
*G06F 15/16* (2006.01)
(52) U.S. Cl. ......... 709/208; 709/203; 709/217; 715/700
(58) Field of Classification Search .......... 709/202–203, 709/208, 217–219; 700/19–20; 715/700, 715/716
See application file for complete search history.

(56) References Cited

U.S. PATENT DOCUMENTS

| 6,125,387 | A * | 9/2000 | Simonoff et al. ............. 709/203 |
| 6,198,479 | B1 * | 3/2001 | Humpleman et al. ........ 709/202 |
| 6,539,433 | B1 * | 3/2003 | Tominaga et al. ............ 709/202 |
| 6,546,419 | B1 * | 4/2003 | Humpleman et al. ........ 709/202 |
| 6,868,292 | B2 * | 3/2005 | Ficco et al. ..................... 700/19 |
| 7,010,589 | B2 * | 3/2006 | Ewing et al. .................. 709/223 |
| 7,412,538 | B1 * | 8/2008 | Eytchison et al. ............ 709/227 |
| 7,496,652 | B2 * | 2/2009 | Pezzutti ........................ 709/217 |
| 7,574,505 | B2 * | 8/2009 | Park et al. ..................... 709/208 |
| 2003/0037139 | A1 * | 2/2003 | Shteyn .......................... 709/201 |
| 2003/0106062 | A1 * | 6/2003 | Shteyn et al. ................... 725/78 |
| 2004/0090458 | A1 * | 5/2004 | Yu et al. ........................ 345/760 |
| 2005/0068222 | A1 | 3/2005 | Krzyzanowski et al. |
| 2007/0210908 | A1 * | 9/2007 | Putterman et al. ............ 340/506 |
| 2008/0046539 | A1 * | 2/2008 | Lee et al. ...................... 709/217 |
| 2010/0217837 | A1 * | 8/2010 | Ansari et al. .................. 709/218 |

FOREIGN PATENT DOCUMENTS

WO 2005/055167 A1 6/2005

* cited by examiner

*Primary Examiner* — Bharat Barot
(74) *Attorney, Agent, or Firm* — Sughrue Mion, PLLC (57) ABSTRACT

Provided are a home network device service and/or Internet service method and apparatus in a home network with a web-based open architecture, the method comprising: receiving script based software for controlling the service from a server using a controller in a home network; reproducing a user interface screen for controlling the service by parsing the script based software using the controller; and controlling the home network device control service and/or the Internet service using the controller according to the selected service when a service is selected based on the UI screen. Accordingly, a home network which can be expanded easily can be obtained.

15 Claims, 7 Drawing Sheets

```
<Web page source>

<HTML>
<HEAD>
<TITLE>EPG</TITLE>
<SCRIPT Language="JavaScript"
src="/ts/portal/display.js"></SCRIPT>
<!--
function OnScheduledRecording(StartTime, Duration, Channel)
{
    var obj=document.getElementById("HNC");
    var DEV=obj.FindDevice("Recorder");
    if(dev !=NULL){
        obj.SetScheduledRecording(dev,StartTime,Duration,Channel);
    }
}
...
<tr>
<td colspan="2"><font color="#666666">
<a href="JavaScript:OnScheduledRecording("2006-06-
12T9:00","1:00:00","EBS")">
    SCHEDULED RECORD</a>
</td>
</tr>...
```

```
<Plug-in Module>

FindDevice(...) {...}
SetScheduledRecording(...) {...}
Play(...) {...}
...
```

HOME NETWORK DEVICE CONTROL SERVICE AND/OR INTERNET SERVICE METHOD AND APPARATUS THEREOF FOR CONTROLLING INTERNET SERVICES AND HOME NETWORK DEVICES BASED ON A SCRIPT

CROSS-REFERENCE TO RELATED PATENT APPLICATIONS

This application claims the priority of Korean Patent Application No. 10-2007-0042112, filed on Apr. 30, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to a home network, and more particularly, to a home network device control service and/or Internet service method using a home network control device and an apparatus for the service.

2. Description of the Related Art

It is difficult to fully utilize a home network with a single home network device. For example, if a user who has bought a digital TV (DTV) that supports network streaming does not interface the digital TV with a media server, he/she cannot use a home network function. Therefore, with regard to a home network technique, the interface environment between devices is a big issue. A home network device control method using a remote user interface (UI) is for providing an interface environment between home network devices. The conventional remote UI technique includes an expandable home theater (XHT), Crawford Engineering Associates (CEA) 201.4, an extended remote technology (XRT), etc.

Figure 1:
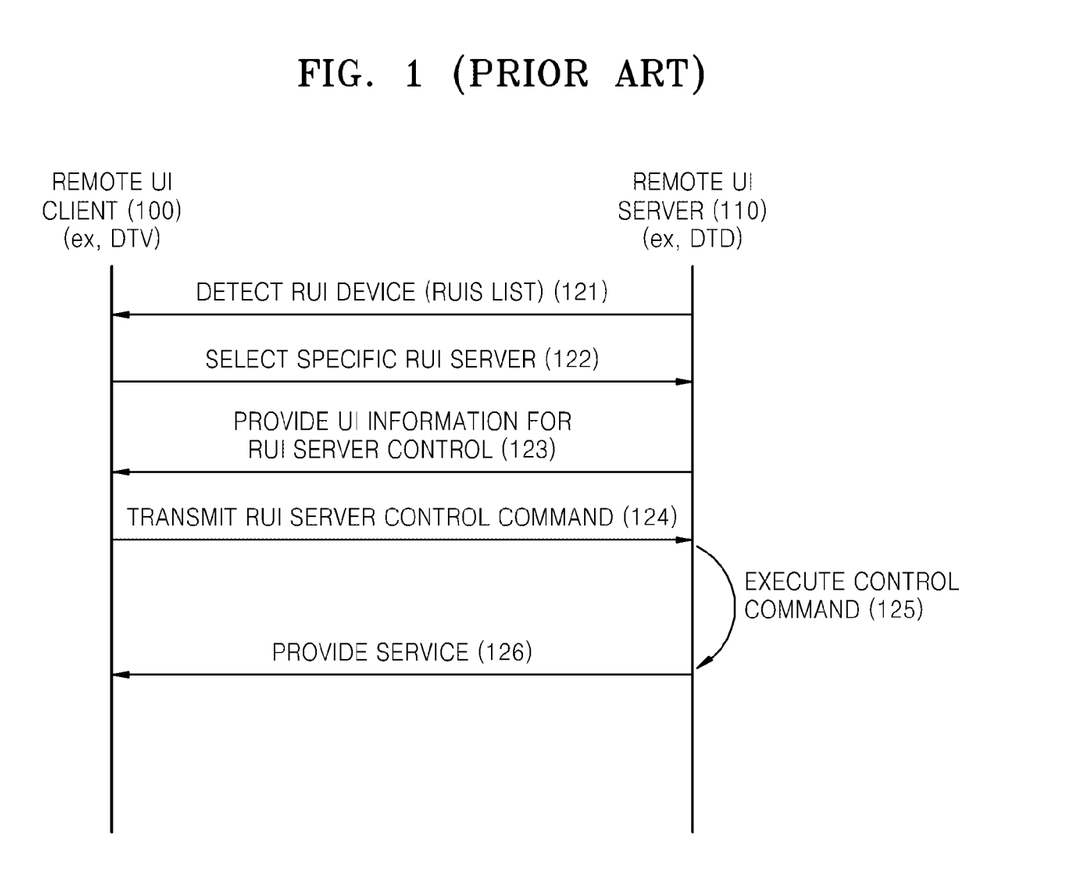
FIG. 1 is a flowchart of the conventional home network device control method using a remote user interface (UI)

FIG. 1 is a flowchart of the conventional home network device control method using a remote UI. Referring to FIG. 1, the home network device control is performed by a remote UI client 100 and a remote UI server 110. The remote UI client 100 is a home network controller, and the remote UI server 110 is a controlled device in a home network.

The remote UI controller 100 obtains an accessible remote UI server list by searching for remote UI devices in the home network using such methods as universal plug and play (UPnP) device discovery (operation 121). When a specific remote UI server is selected from the remote UI server list (operation 122), the remote UI server 110 provides the remote UI client 100 with UI information for controlling the remote UI server 110 (operation 123). When a user inputs selection information based on the UI information, the remote UI client 100 transmits a remote UI server control command based on the selection information to the remote UI server 110 (operation 124). The server control command may be, for example, a play command, a stop command, a caption on/off command, and so on, if the remote UI server 110 is a digital video disc (DVD) player. The remote UI server 110 executes the received control command (operation 125), and provides the remote UI client 100 with a service corresponding to the control command.

However, the conventional home network device control method using the remote UI can use only services that are provided from the remote UI server 110. Also, when it is desired that a home network device be connected to the Internet, only functions that are provided by the home network device can be used. Thus, in the conventional home network environment, a user cannot control the home network device according to his/her preference and it is difficult to expand the range of Internet services using the home network device.

SUMMARY OF THE INVENTION

The present invention provides a web-based open architecture home network device control service and/or Internet service method and an apparatus for performing the method.

The present invention also provides a home network device control service and/or Internet service method which performs control functions of home network devices and an Internet service using an open application program interface.

According to an aspect of the present invention, there is provided a method of a home network device control service and/or an Internet service, the method comprising: receiving script based software for controlling the service from a server using a controller in a home network; reproducing a user interface (UI) screen for controlling the service by parsing the script based software using the controller; and controlling the at least one of home network device control service and Internet service using the controller according to the selected service when a service is selected based on the UI screen.

When the selected service is the Internet service, the controlling of the service may include parsing a script of the selected Internet service; checking if a plug-in for performing a function defined in the script is needed; connecting to a uniform resource locator (URL) of the Internet service if the plug-in is not needed; checking if the plug-in is installed in the controller if the plug-in is needed, and connecting to a URL of the Internet service if the plug-in is installed in the controller; and changing a screen of the controller to a screen for the Internet service after connecting to the URL of the Internet service.

In the reproducing of the UI screen, a dynamic UI screen based on the function that the home network device supports may be generated when the script based software is parsed.

When the selected service is a home network device control service, the controlling of the service may include executing a script for the selected service; calling an application program interface (API) for performing the selected service according to the execution of the script; checking if there is a home network device that performs the selected service by performing the called open API in the home network; and sending a control command or a control command together with contents for the selected service to the home network device so that the home network device performs the selected service when the home network device is present.

The controlling of the service may include checking if the home network device to perform the selected service is powered on; and controlling the selected service after powering on the home network device remotely when the home network device is powered off.

When the selected service is a service for interfacing between an Internet service and a home network device control service, the controller may receive the selected Internet service and send information about the selected Internet service or a control command or the control command together with a parameter about the Internet service to a corresponding home network device.

According to another aspect of the present invention, there is provided an apparatus for a home network device control service and an Internet service, the apparatus comprising: a server which provides script based software for controlling the at least one of home network device control service and Internet service; a controller which reproduces a UI screen by parsing the script based software received from the server and controls a service that a user selects based on the script based software;

an Internet service module which performs an Internet service that the controller requests; and a home network device control service module which performs a home network device control service that the controller requests.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

Figure 2:
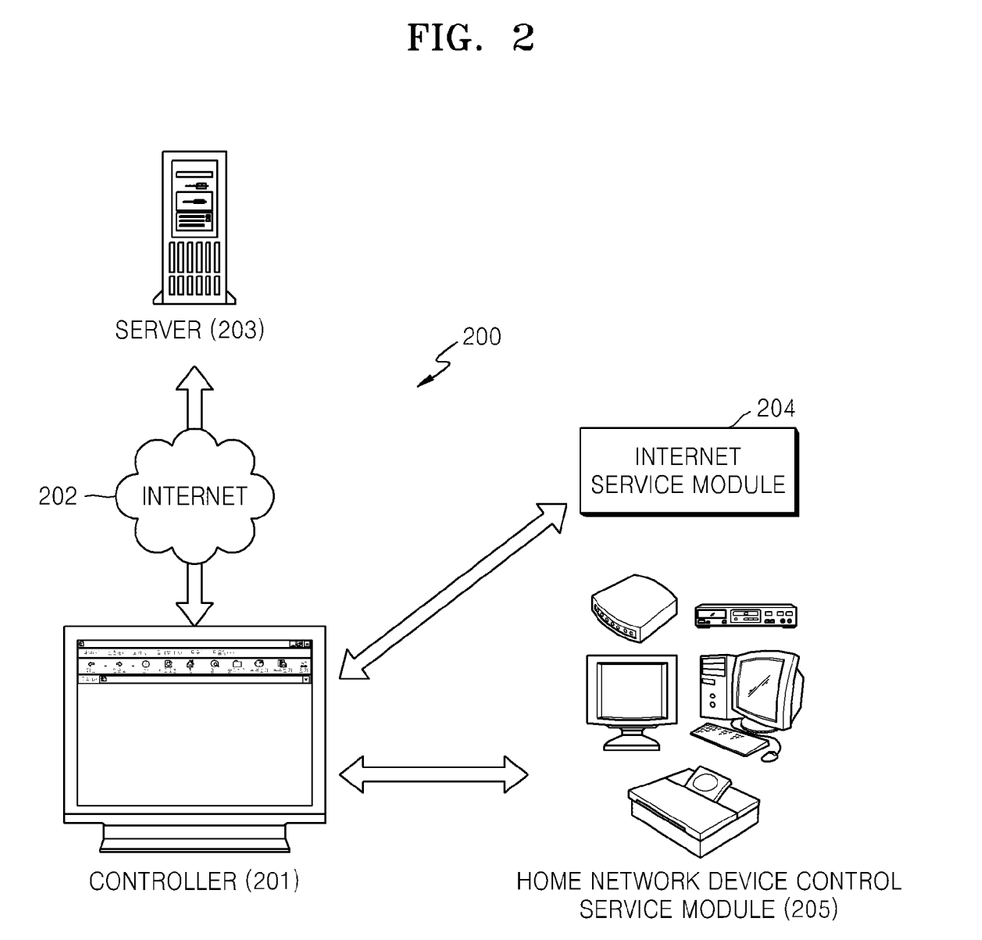
FIG. 2 is a drawing for explaining a home network device control service and/or Internet service apparatus according to an exemplary embodiment of the present invention.

FIG. 2 is a drawing for explaining a home network device control service and/or Internet service apparatus 200 according to an exemplary embodiment of the present invention. Referring to FIG. 2, the apparatus 200 includes a controller 201, the Internet 202, a server 203, an Internet service module 204, and a home network device control service module 205.

The controller 201 controls a controlled device which is connected to a home network. The controller 201 downloads software for controlling a service from the server 203 through the Internet 202 in response to a user's request. A service to be controlled includes an Internet service and a home network device control service (or a home network device control function). The software is based on an automated and personalized script in controlling the service. That is, the software is based on script suitable for the user's home network environment.

The controller 201 recombines the home network device control service and the Internet service using the software downloaded in response to the user's request and can use the recombined services. Thus, the expansion of the Internet service and the home network device control service is easy. This is because the software is defined as a script for the open application program interface (API) for the home network device control service and the Internet service. If the controller 201 is a consumer electronics-hypertext markup language (CE-HTML) TV or a web-browser based TV, the script may be javascript that is included in HTML.

The controller 201 parses the downloaded software and displays a user interface (UI) screen, which shows services to be able to control based on home network devices and services that the user can control, using a browser. When the user makes a selection based on the displayed UI screen, the controller 201 connects to the Internet service in order to perform the selected service, using the downloaded software, and displays an Internet service screen that the user requested to the controller 201 or controls the home network device at the user's home.

That is, the controller 201 in FIG. 2 connects to the Internet service module 204 to perform the selected service, provides the user with various Internet services, is able to control at least one home network device which is included in the home network device control service module 205, and is also able to control the interface between the Internet service module 204 and the home network device control service module 205. The controller 201 receives an Internet service provided by the Internet service module 204 and sends information about the received Internet service, a control command, or parameter about the received Internet service to a specific home network device of the home network device control service module 205, and thus can control the interface between the Internet service module 204 and the home network device control service module 205. The controller 201 sends the control command and the parameter about the received Internet service to the specific home network device only when the home network device has the Internet connection function.

The user can create the software for a home network device control service and an Internet service that satisfy the user's preference by using the script that the controller 201 manages, and can share the software with other users by uploading the software to the server 203 through the Internet 202.

The controller 201 can resend the received script to the specific home network device of the home network device control service module 205. Accordingly, the user can directly control the specific home network device based on the script received by the specific home network device without controlling the controller 201. The specific home network device is a home network device for performing a service that user selects.

The script received from the server 203 may include information of an Internet advertisement portal. If the script received from the server 203 includes the information of the Internet advertisement portal, the controller 201 may produce UI information which includes the information of the Internet advertisement portal included in the script or may send the information of the Internet advertisement portal to the specific home network device of the home network device control service module 205. When the controller 201 sends the information of the Internet advertisement portal to the specific home network device, the specific home network device which includes a display unit can display the information of the Internet advertisement portal using the display unit.

The server 203 provides the software based on the script for the home network device control service and the Internet service to the controller 201 through the Internet 202. Also, the server 203 is a space where a variety of users can create and share software (or scripts) for the Internet service and the home network device control service. If the controller 201 is a CE-HTML TV, the server 203 may be defined as a CE-HTML server. The server 203 may be called an Internet portal or an Internet portal server.

The Internet service module 204 performs the Internet service that the controller 201 requested and provides the result of performing the Internet service to the controller 201. The Internet service module 204 may include an internet service module, for example, Google map viewing, viewing of photo images of the website "Flickr," and the like.

The home network device control service module 205 which comprises controlled devices performs the service that the controller 201 requested. For example, a print function, a broadcasting program recording function, and the like may be performed by the home network device control service module 205.

Figure 3:
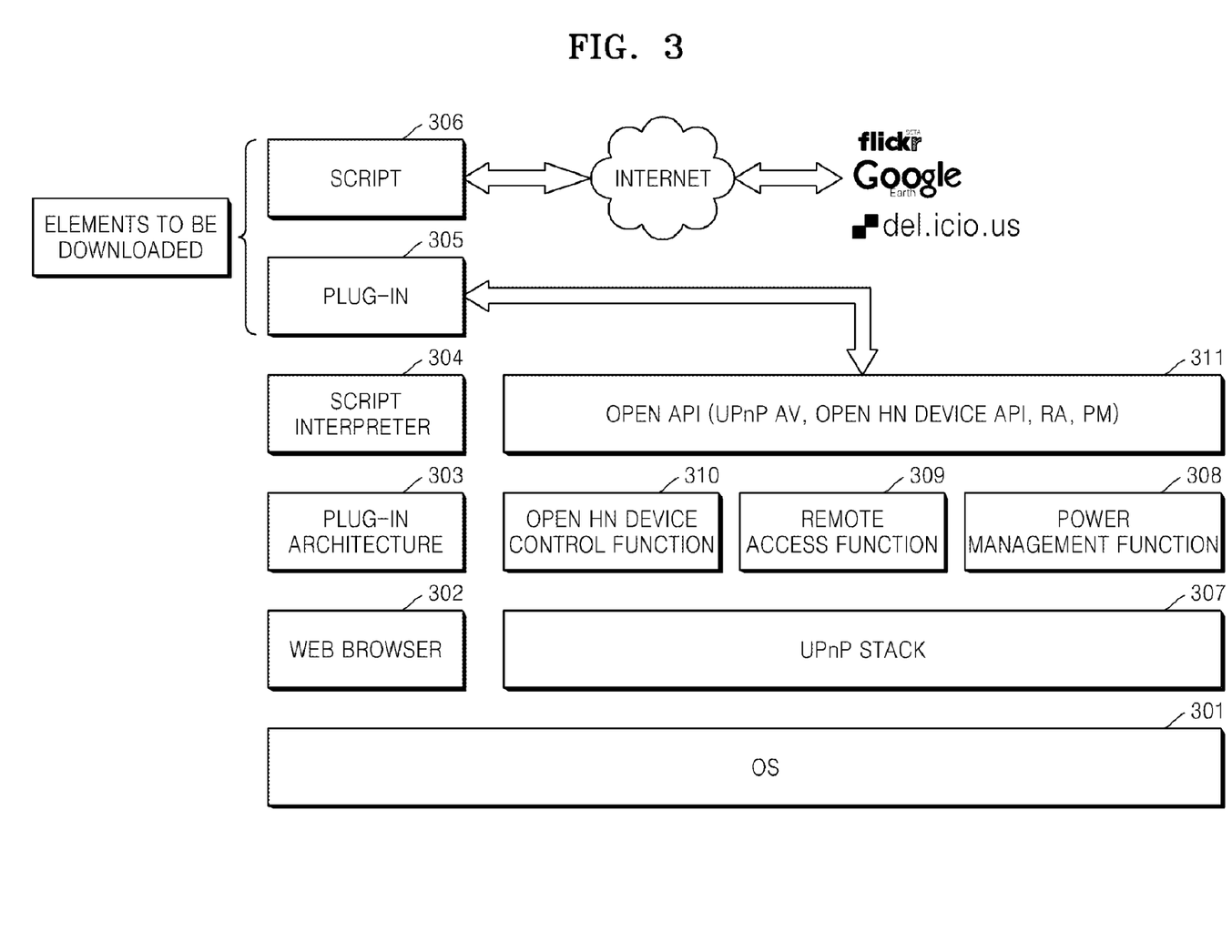
FIG. 3 is a software block diagram corresponding to the apparatus illustrated in FIG. 2.

FIG. 3 is a software block diagram corresponding to the apparatus illustrated in FIG. 2, and this diagram can be a software block diagram of the controller 201. Referring to FIG. 3, a web browser 302 included in the controller 201 reproduces a UI by parsing the received software. When the received software is a CE-HTML document, the web browser 302 parses a script included in the CH-HTML document, and when a service control command needs to be executed, the web browser 302 calls a service related API that is defined by an open API 311. For example, when contents received through the Internet 202 are desired to be printed, the called service related API may be an API related to a print command.

Moreover, when a plug-in module needs to be added to operate an API for service control, a plug-in 305 may be downloaded from the server 203 and be set in the controller 201. When only script information is downloaded, the controller 201 can directly control the home network device control service and the Internet service using the script without a UI.

An open API 311, an open home network (HN) device control function 310, a remote access function 309, a power management function 308, a UPnP stack 307 which are shown in the right side of FIG. 3 are a block that controls or manages the home network device control service module 205 with regard to a service that the controller 201 requests through the script. The remote access function 309, the power management function 308, and the UPnP stack 307 are examples for UPnP based operations, and the block that controls or manages the home network device control service module 205 can be expanded and altered according to a home network protocol. In order to use an UPnP command in the script, the UPnP based command is generally used in an IP based home network, an open API is required, and it is necessary to make the home network device control service suitable for the open API by additionally defining a function that the UPnP or digital living network alliance (DLNA) does not define. Therefore, in order to manage the home network device control service module 205, the controller 201 defines the open HM device control function 310 for controlling the home network device, the remote access function 309 that allows the external connection and control, and the power management function 308 that can turn on/off the power of the home network device that the controller 201 desires to control.

FIG. 3 may include a software block diagram of an apparatus under the control of an IP based home network or a home network that interfaces with a non-IP device. If the network is not an IP based network, an appropriate communication method between the plug-in that executes a received script command and the home network device is needed, and for this communication, the control service of the home network device, should be for the open API. For example, when the controlled device receives a control command using a high definition multimedia interface (HDMI), the controller 201 interprets a script command and issues a control command which is based on an open API ∞ a HDMI-consumer electronic control (CEC) command instead of an IP based network. Therefore, the present invention can be applied to any home network technologies that can be re-defined as an open API, as well as an IP based home network. In addition, the interface between the internet services can be performed using an open API from the server 203.

Figure 4:
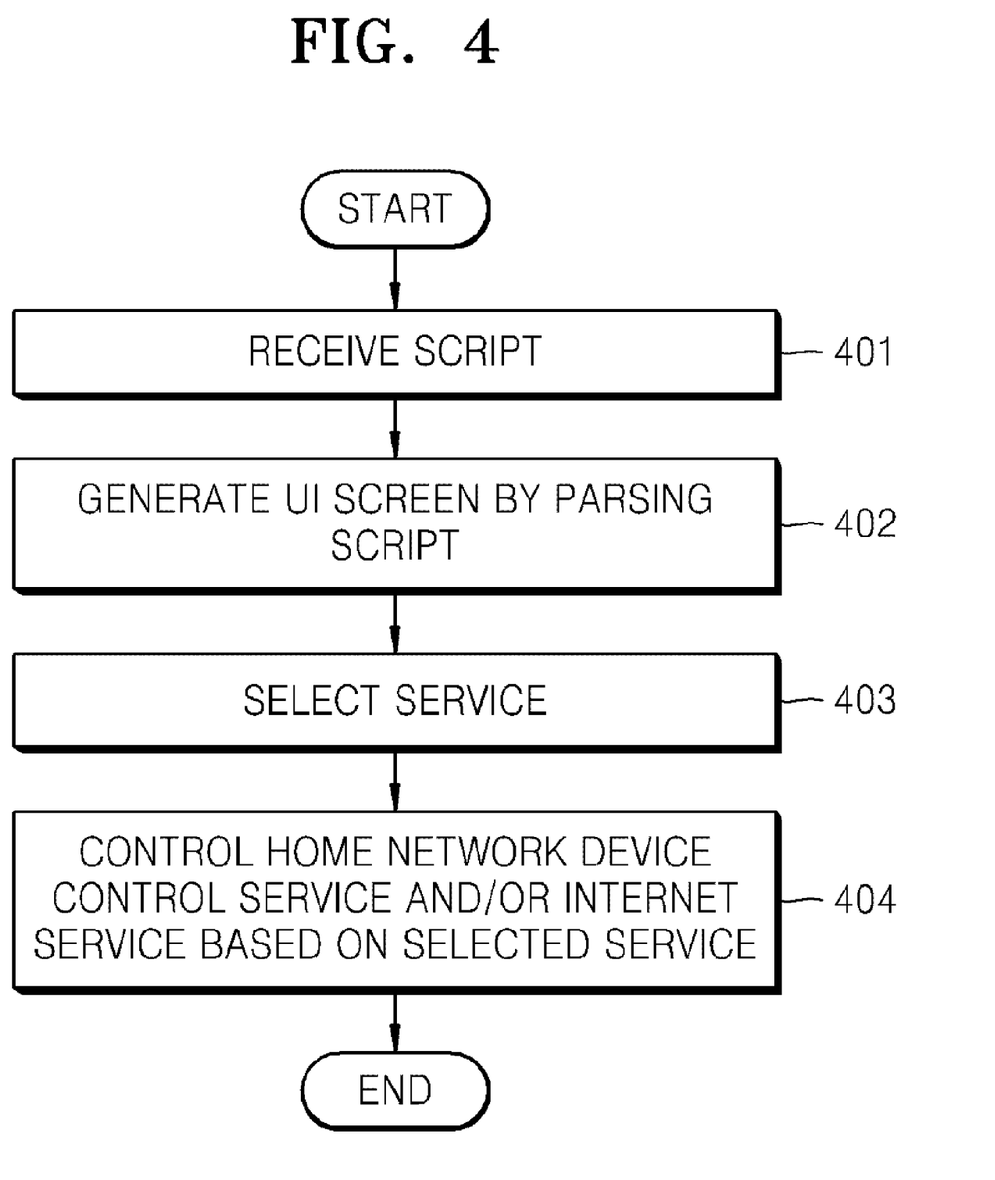
FIG. 4 is a flowchart of a home network device control service and Internet service method according to an exemplary embodiment of the present invention.

FIG. 4 is a flowchart of a home network device control service and Internet service method according to an exemplary embodiment of the present invention. The method of FIG. 4 now will be described in conjunction with FIG. 2.

The controller 201 in the home network receives script-based software for controlling the home network device control and/or the Internet service from the server 203 (operation 401). The controller 201 parses the script-based software and reproduces a UI screen for the service control (operation 402). When a desired service is selected based on the reproduced UI screen (operation 403), the controller 201 controls the home network device control service and/or the Internet service according to the selected service (operation 404). To this end, the controller 201 is interfaced with the Internet service module 204 and/or the home network device control service module 205 as illustrated in FIG. 2.

Figure 5:
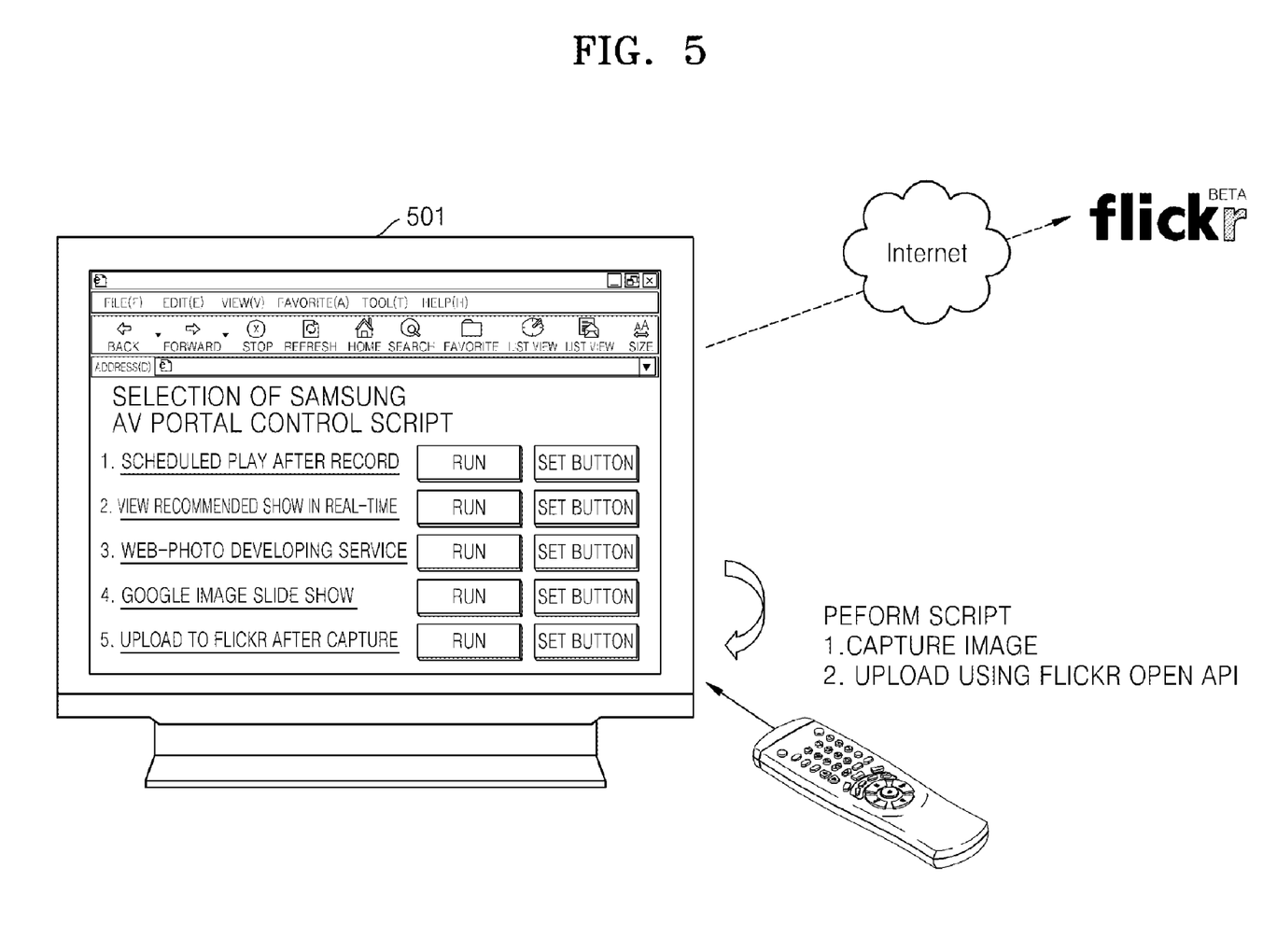
FIG. 5 shows an example of the UI screen that is reproduced on the control device in FIG. 2 when automated and personalized software is downloaded from a particular portal.

FIG. 5 shows an example of the UI screen that is reproduced on a digital TV (DTV) 501 that is used as the control device 201 in FIG. 2 when automated and personalized software is downloaded from a particular portal. The interface between DTV 501 and the Internet service will now be described based on the UI screen illustrated in FIG. 5.

When an activation button of "Google photo slide show" on the fourth row in the UI screen is selected, a browser of the DTV 501 parses script information about the Google photo slide show. Then it is checked whether a plug-in is needed to perform a function that is defined in the script. If the plug-in is not needed, the browser of the DTV 501 connects to a uniform resource locator (URL) of the Internet service in order to perform the selected service. When the plug-in is needed, the browser of the DTV 501 checks if the necessary plug-in is installed in the DTV 501. When the necessary plug-in has not been installed in the DTV 501, the browser of the DTV 501 downloads the necessary plug-in from the server 203 in FIG. 2, installs the plug-in in the DTV 501, and connects to the URL of the Internet service. Subsequently, the browser screen of the DTV 501 is changed to a screen that can provide the Internet service for the Google photo slide show, and the user is provided with the Internet service for the Google photo slide show.

Figure 6:
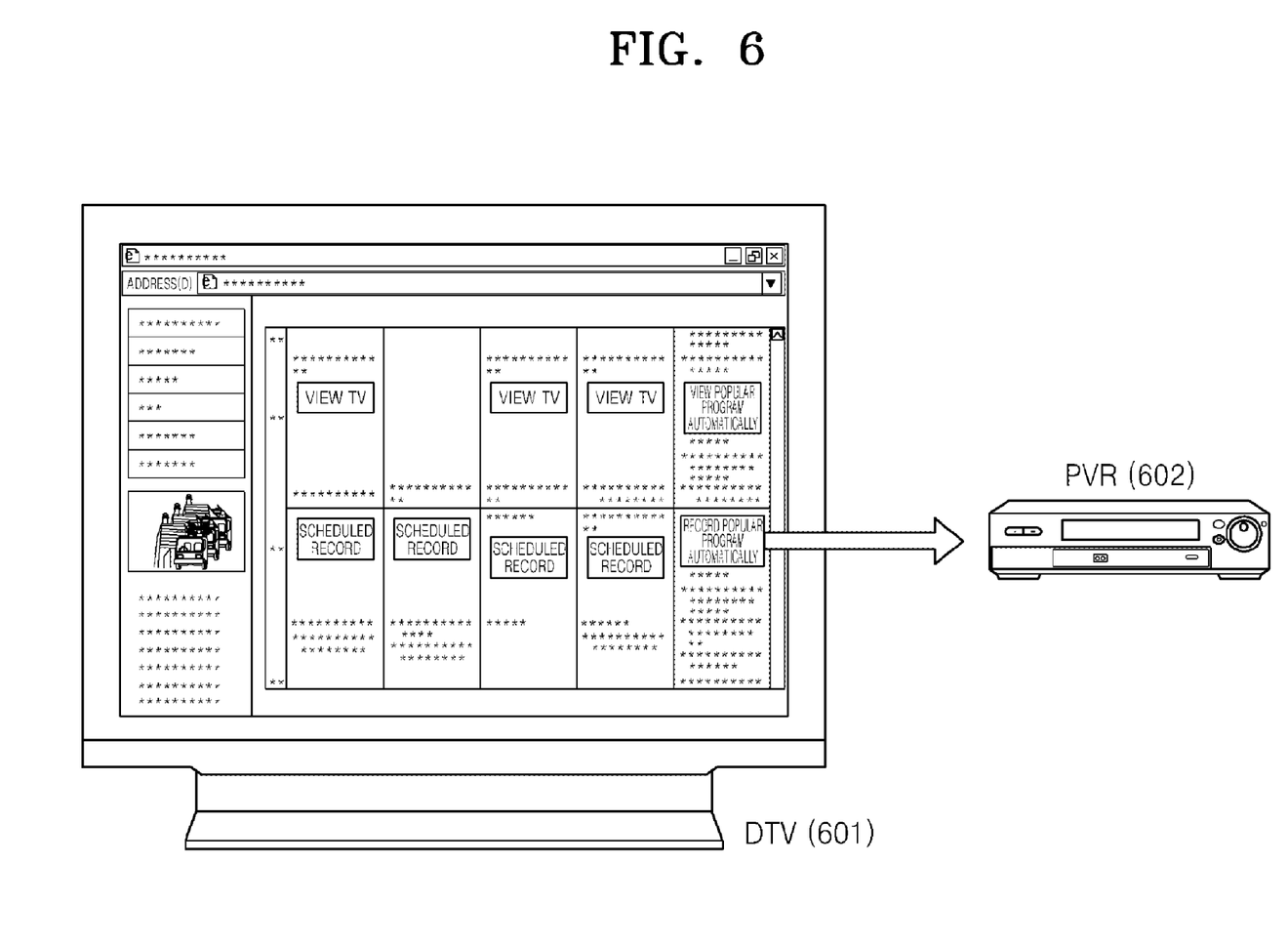
FIG. 6 shows an example of a hypertext markup language (HTML) based electronic program guide (EPG) screen that is reproduced in a digital TV (DTV) that is used as the controller in FIG. 2.

FIG. 6 shows an example of an HTML based EPG screen that is reproduced in a DTV 601 that is used as the controller 201 in FIG. 2. Icons for "view TV" "scheduled recording" "view popular program automatically," and "record popular program automatically" are HTML based UI. In the course of producing such UI, the controller 201 generates dynamic UI based on a function supported by the home network device at the user's home. For example, the controller 201 generates the UI to display a specific icon when the DTV 601 browses HTML information only if there is a personal video recorder (PVR) 602 at the user's home.

The view and schedule recording shown in FIG. 6 are home network device control services using a script, and the view popular program automatically and record popular program automatically shown in FIG. 6 are scripts for services that require the interface between the Internet service and the home network device control service.

In order to reproduce a UI in DTV (601) as shown in FIG. 6, the DTV 601 registers and connects to an electronic program guide (EPG) service which is produced using a CE-HTML through the Internet. When the UI is generated by parsing the received HTML, dynamic HTML UI is generated based on the functions that the home network device supports. When the UI that have been generated by the above procedures is like that illustrated in FIG. 6, if the user selects a button for the view popular program automatically, an appropriate open API is called while the script for the automatic recording of a popular program is being executed. Then, it is checked if the PVR 602 is turned on, and if the PVR 602 is powered OFF, the DTV 601 turns on the PVR remotely. Next, the DTV 601 sends an automatic recording script to the PVR 602. The PVR 602 performs the recording after searching the popular program by connecting to the specific Internet according to the execution of the script. In this case, the PVR 602 has an Internet connection function, and the DTV 601 sends a parameter about the Internet service together with the automatic recording script to the PVR 602. The PVR 602 may attempt to connect to the Internet based on the parameter. As such, various applications can be provided to a user through a downloadable plug-in and the open API using the browser of the DTV 601. The above description is an exemplary embodiment in an environment where a PVR can receive a script from a DTV and execute the script. It is possible that the DTV executes the script, receives the popular program from the Internet, and sends a recording control command to the PVR.

Figure 7:
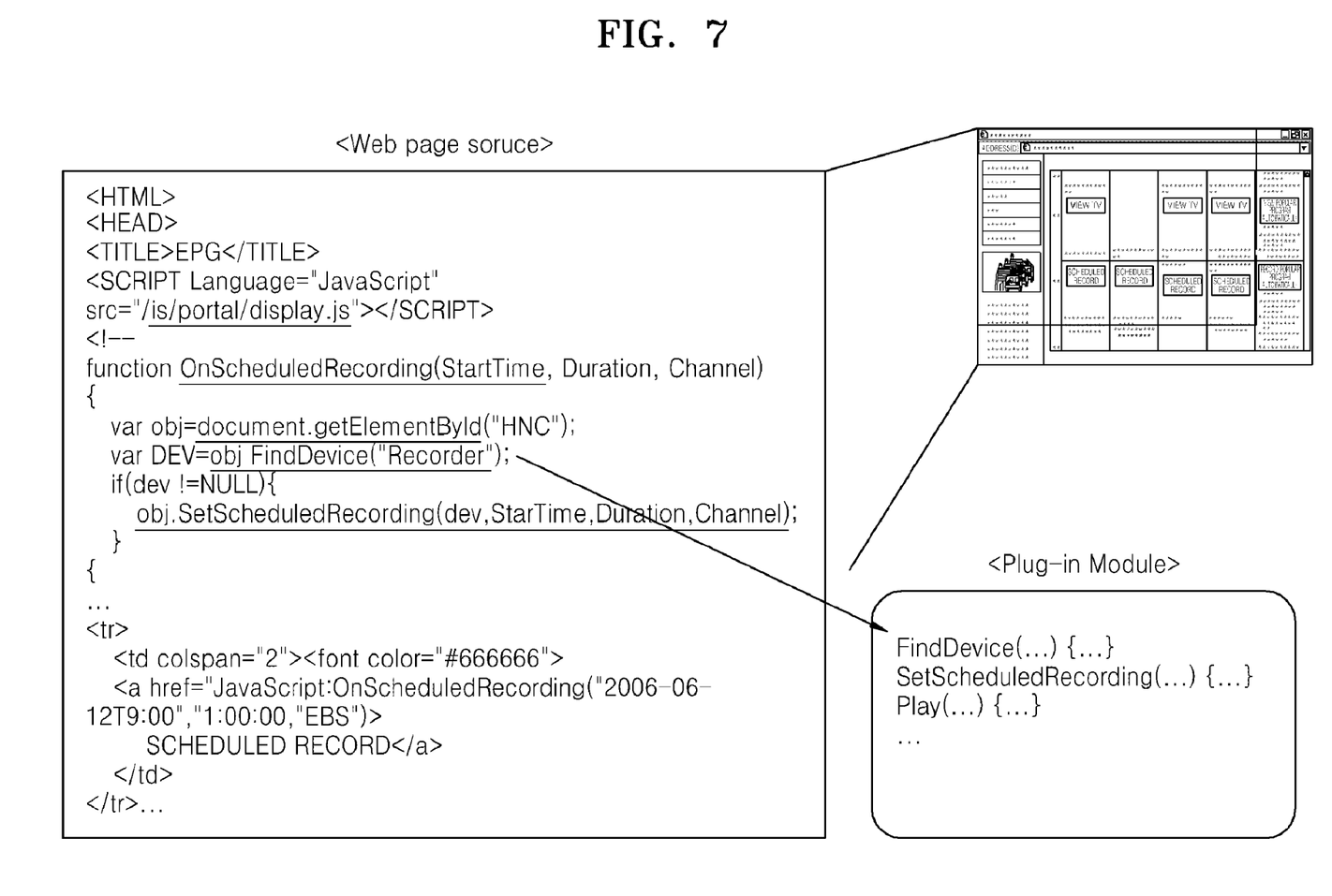
FIG. 7 shows examples of a consumer electronics-hypertext markup language (CE-HTML) script and a plug-in operation for the HTML based EPG screen in FIG. 6

FIG. 7 shows examples of a CE-HTML script and a plug-in operation for the HTML based EPG screen illustrated in FIG. 6. A web page source that has been made using CE-HTML includes the script, and the script in FIG. 7 is javascript. If the user selects the scheduled recording, "on ScheduledRecording Function" is called as an open API. By executing the open API, it is checked if there is a home network device that can perform a PVR function, and if there is a device that can perform the PVR function, control information including the starting time of scheduled recording, the duration of recording, and channel information is sent to the home network device which functions as the PVR. The channel information may be a parameter for the Internet service. "obj.FindDevice" in the javascript is an example of a plug-in function, and an obj.FindDevice plug-in may perform functions for finding a PVR (FindDevice( )), scheduled recording setting (SetScheduledRecording( )), and play (Play( )).

The home network device control service and/or Internet service method according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the present invention, a home network device control service and the Internet service are performed using an open application program interface, thereby providing a user with open architecture that allows a variety of control services to be utilized in a home network. Moreover, a home network control technique which can be easily expanded can be provided, and the user can also be provided with the utility of a home network even with a single home network device.

Since software based on a script that is easy for a user to create is provided for the home network device control service and Internet service and the script can be shared with other users, the users can share various service scenarios and a personalized home network device control service and Internet service which satisfy the user's preference and environment can be operated.

Furthermore, since it is possible to create a script that enables various home network device control services and Internet services to be operated with one-button performance, a variety of automatic services can be provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a home network device control service and an Internet service, the method comprising:
   receiving a script from a server, by a controller in a home network;
   parsing the script, by the controller;
   generating a user interface (UI) screen based on the parsed script;
   selecting a service listed on the generated UI screen; and
   controlling, by the controller, at least one of the home network device control service and the Internet service based on the selected service;
   wherein the user interface screen is displayed on the controller.

2. The method of claim 1, wherein if the selected service is the Internet service, the controlling further comprises:
   parsing a script of the selected Internet service;
   checking if a plug-in for performing a function defined in the script of the selected Internet service is needed;
   connecting to a uniform resource locator (URL) of the Internet service if the plug-in is not needed;
   checking if the plug-in is installed in the controller if the plug-in is needed, and connecting to a URL of the Internet service if the plug-in is installed in the controller; and
   changing a screen of the controller to a screen for the Internet service after connecting to the URL of the Internet service.

3. The method of claim 2, wherein if the plug-in is needed, the plug-in is downloaded from the server and installed in the controller.

4. The method of claim 1, wherein the generating the UI screen further comprises, generating a dynamic UI screen based on a function that is supported by a home network device if the script is parsed.

5. The method of claim 1, wherein if the selected service is the home network device control service, the controlling further comprises:
   executing a script for the selected service in an execution;
   calling an application program interface (API) for performing the selected service based on the execution of the script for the selected service;
   checking if there is a home network device that performs the selected service by performing the called open API in the home network; and
   sending a control command or a control command together with contents for the selected service to the home network device so that the home network device performs the selected service if the home network device is present.

6. The method of claim 5, wherein the controlling further comprises checking if the home network device is powered on; remotely powering on the home network device if the home network device is powered off, and controlling the selected service.

7. The method of claim 1, wherein if the selected service is a service for interfacing between the Internet service and the home network device control service, the controller sends information about the Internet service or a control command or the control command together with a parameter about the Internet service to a corresponding home network device.

8. The method of claim 1, wherein if the selected service is the home network device control service, controlling the service further comprises sending the script, by the controller, to a home network; and controlling the home network device to perform the selected service based on the sent script.

9. The method of claim 1, wherein the script is a personalized script used for controlling the home network device control service and an Internet service.

10. An apparatus for a home network device control service and an Internet service, the apparatus comprising:
   a server which provides a script for controlling at least one of the home network device control service and the Internet service;
   a controller which parses the script, generates a user interface (UI) screen based on the parsed script received from the server, selects a service listed on the generated UI screen and controls the selected service;
   an Internet service module which performs the Internet service; and
   a home network device control service module which performs the home network device control service;
   wherein the user interface screen is displayed on the controller.

11. The apparatus of claim 10, wherein the controller generating a dynamic UI screen based on a function that the home network device supports.

12. The apparatus of claim 10, wherein if the selected service is the Internet service, the controller checks if a plug-in is needed for performing a function defined in a script of the selected service, connects to an uniform resource locator (URL) of the Internet service, and changes a screen of the controller to a screen for the Internet service.

13. The apparatus of claim 10, wherein if the selected service is the home network device control service, the controller sends a control command or a control command together with contents for the selected service to a home network device so that the home network device performs the selected service.

14. The apparatus of claim 10, wherein if the selected service is a service for interfacing between an Internet service and a home network device control service, the controller sends information about the Internet service, a control command or a control command together with a parameter about the Internet service to the home network device o control an interface service between the home network device control service and the Internet service.

15. The apparatus of claim 10, wherein if the selected service is a home network device control service, the controller sends the script to a home network device to perform the selected service, and the home network device is controlled based on the sent script.

* * * * *